United States Patent
Sechrist et al.

(10) Patent No.: US 8,182,654 B2
(45) Date of Patent: May 22, 2012

(54) HEAT PUMP FOR HIGH PURITY BOTTOM PRODUCT

(75) Inventors: Paul A. Sechrist, South Barrington, IL (US); David A. Wegerer, Lisle, IL (US)

(73) Assignee: UOP LLC, Des Plaines, IL (US)

( * ) Notice: Subject to any disclaimer, the term of this patent is extended or adjusted under 35 U.S.C. 154(b) by 784 days.

(21) Appl. No.: 12/258,933

(22) Filed: Oct. 27, 2008

(65) Prior Publication Data

US 2010/0101930 A1    Apr. 29, 2010

(51) Int. Cl.
*B01D 1/28* (2006.01)
*B01D 3/10* (2006.01)

(52) U.S. Cl. ............... 203/26; 203/27; 203/94; 203/98; 203/DIG. 4; 203/DIG. 8; 203/99; 203/DIG. 19; 585/800

(58) Field of Classification Search .......... 203/26, 203/27, 94, 98, 99, DIG. 4, DIG. 8, DIG. 19; 208/357, 358, 366; 585/800
See application file for complete search history.

(56) References Cited

U.S. PATENT DOCUMENTS

| | | | | |
|---|---|---|---|---|
| 4,284,423 A | * | 8/1981 | Eakman et al. | 62/622 |
| 4,444,576 A | * | 4/1984 | Ryan et al. | 62/632 |
| 4,539,076 A | | 9/1985 | Swain | |
| 4,575,405 A | * | 3/1986 | Sterlini | 203/24 |
| 4,615,769 A | | 10/1986 | Horigome et al. | |
| 4,732,597 A | * | 3/1988 | Jujasz et al. | 62/652 |
| 5,124,004 A | * | 6/1992 | Grethlein et al. | 203/19 |
| 5,252,187 A | * | 10/1993 | Ohtsu et al. | 203/26 |
| 5,360,533 A | | 11/1994 | Tagamolila et al. | 208/101 |
| 5,584,985 A | | 12/1996 | Lomas | 208/113 |
| 5,858,206 A | | 1/1999 | Castillo | 208/101 |
| 6,538,169 B1 | | 3/2003 | Pittman et al. | 585/653 |
| 6,558,515 B1 | | 5/2003 | Steacy | 203/1 |
| 6,843,906 B1 | | 1/2005 | Eng | 208/210 |
| 7,267,746 B1 | | 9/2007 | Harris et al. | 202/160 |
| 2006/0006054 A1 | | 1/2006 | Gobbel et al. | |
| 2009/0114524 A1 | * | 5/2009 | Sechrist | 203/98 |
| 2010/0101273 A1 | | 4/2010 | Sechrist et al. | |
| 2010/0108487 A1 | * | 5/2010 | Townsend | 203/26 |
| 2011/0272267 A1 | * | 11/2011 | Sechrist | 203/27 |

FOREIGN PATENT DOCUMENTS

EP    0010253 A1    4/1980

OTHER PUBLICATIONS

PCT International Search Report and Written Opinion for Applicant's file reference H0018058; International Application No. PCT/US2009/058726; ISA: Korea.

* cited by examiner

*Primary Examiner* — Virginia Manoharan
(74) *Attorney, Agent, or Firm* — Mark R Willis

(57) ABSTRACT

A process for reducing the energy consumption of a distillation column is disclosed. The process includes drawing off an intermediate vapor stream from the rectification section of the distillation column. The vapor stream is compressed and the heat in the vapor stream is exchanged with a portion of the liquid bottoms stream. The heat transfer condenses a portion of the vapor stream, while vaporizing the liquid bottoms stream.

19 Claims, 4 Drawing Sheets

HEAT PUMP FOR HIGH PURITY BOTTOM PRODUCT

FIELD OF THE INVENTION

This invention relates to the separation of hydrocarbons. Specifically, the invention relates to improving the energy usage for the separation of hydrocarbon components that have similar boiling points through distillation.

BACKGROUND OF THE INVENTION

The separation of hydrocarbons is a basic process in the petroleum industry. Petroleum is a mixture of many hydrocarbon compounds and the compounds are separated and used for different purposes, such as fuel, lubricants, feedstock to polymer plants, etc. One method of separation in the petroleum industry is distillation. Distillation is a method of separation that is based on a difference in the relative volatilities of the components in a mixture, and therefore differences in the composition between a liquid mixture and a vapor formed from the liquid mixture. In a standard continuous distillation process involving multiple stages, the differences in composition allows for partial separation at each stage. The liquid and vapor phases are passed to different stages, and further produce new liquid and vapor phases in each having different compositions.

A problem exists for distillation systems in that they are large consumers of energy and inefficient with respect to energy usage and consumption. Improvements in design can significantly reduce energy consumption. With increasing energy costs and with increasing pressures to reduce $CO_2$ emissions associated with energy consumption, there is a compelling need for more efficient distillation designs.

SUMMARY OF THE INVENTION

The present invention provides for a more efficient energy usage in the distillation of a mixture. The distillation improvement provides for increasing the purity of the bottoms product while reducing the amount of external energy added, or utility usage, to reboil the bottoms stream to create the vapor for stripping the lighter components from the bottoms stream.

The present invention utilizes the heat from an overhead vapor stream and intermediate vapor stream to reboil liquid from the bottoms stream and an intermediate liquid stream. The process comprises operating a distillation column where a portion of the bottoms liquid stream is drawn off and passed through a pressure reducing valve. This reduced pressure liquid is heat exchanged with a portion of the overhead vapor stream, thereby creating a vaporized bottoms stream and a condensed overhead stream. The overhead stream is passed to the top of the rectifying section as reflux. The vaporized bottoms stream is compressed through a heat pump compressor, thereby adding heat and bringing the stream to at least the column pressure, and then passed to the bottom of the stripping section. The process further comprises drawing off an intermediate liquid stream for reboiling and passing back to the column, preferably in the stripping section of the column. The intermediate liquid stream is passed through a pressure reducing valve and is heat exchanged with a second portion of the overhead vapor stream, where the liquid is vaporized and the overhead vapor is condensed. The condensed overhead stream is passed back to the top of the rectifying section as additional reflux. The vaporized intermediate stream is compressed by a heat pump compressor and passed back to the column at a pressure at least as great as the column pressure. The intermediate stream is preferably passed to a position above where the intermediate liquid stream was drawn off. This provides a method to purify the bottoms stream without having to add a significant amount of additional energy to the distillation column.

Other objects, advantages and applications of the present invention will become apparent to those skilled in the art from the following detailed description and drawings.

DETAILED DESCRIPTION OF THE INVENTION

The separation of fluids is well known in art, and separation by distillation is a common means for separating two or more liquids. A distillation process operates on the principle of different liquid components in a mixture have different volatilities, and therefore will develop an equilibrium where for the more volatile component, the vapor phase has a higher concentration relative to that components concentration in the liquid phase.

In a continuous distillation process, the basic equipment comprises a distillation column having a plurality of plates, an overhead condenser, and a bottoms reboiler. In general the distillation column is a vertically oriented, cylindrical vessel and comprises an inlet for admitting the fluid to be separated, a rectifying section that is above the inlet, and a stripping section that is below the fluid. The plates are typically sieve trays or bubble cap trays, or other trays that allow the liquid to flow across and the vapor to percolate upward through the tray.

During the distillation process there is a vapor phase that moves up the column and a liquid phase that moves down the column. The liquid flows across the plates and down to subsequent plates while the vapor passes through the plates to contact the liquid. This provides a shift in the equilibrium, and therefore composition in the phases as one moves up or down the column. At the bottom of the column, the liquid is partially reboiled to create the vapor stream that continuously moves up through the column, with the remainder drawn off as a bottoms product stream. At the top of the column the vapor is condensed and a portion is directed back into the column to provide a continuous liquid stream passing down through the column, with the remainder drawn off as condensate, or distillate.

However, distillation can be energy intensive, and can require many stages, or plates, depending on the properties of the components in the mixture to be separated. This is important for mixtures of liquids that have close boiling points, due to increasing the number of stages to effect a desired separation.

Figure 1:
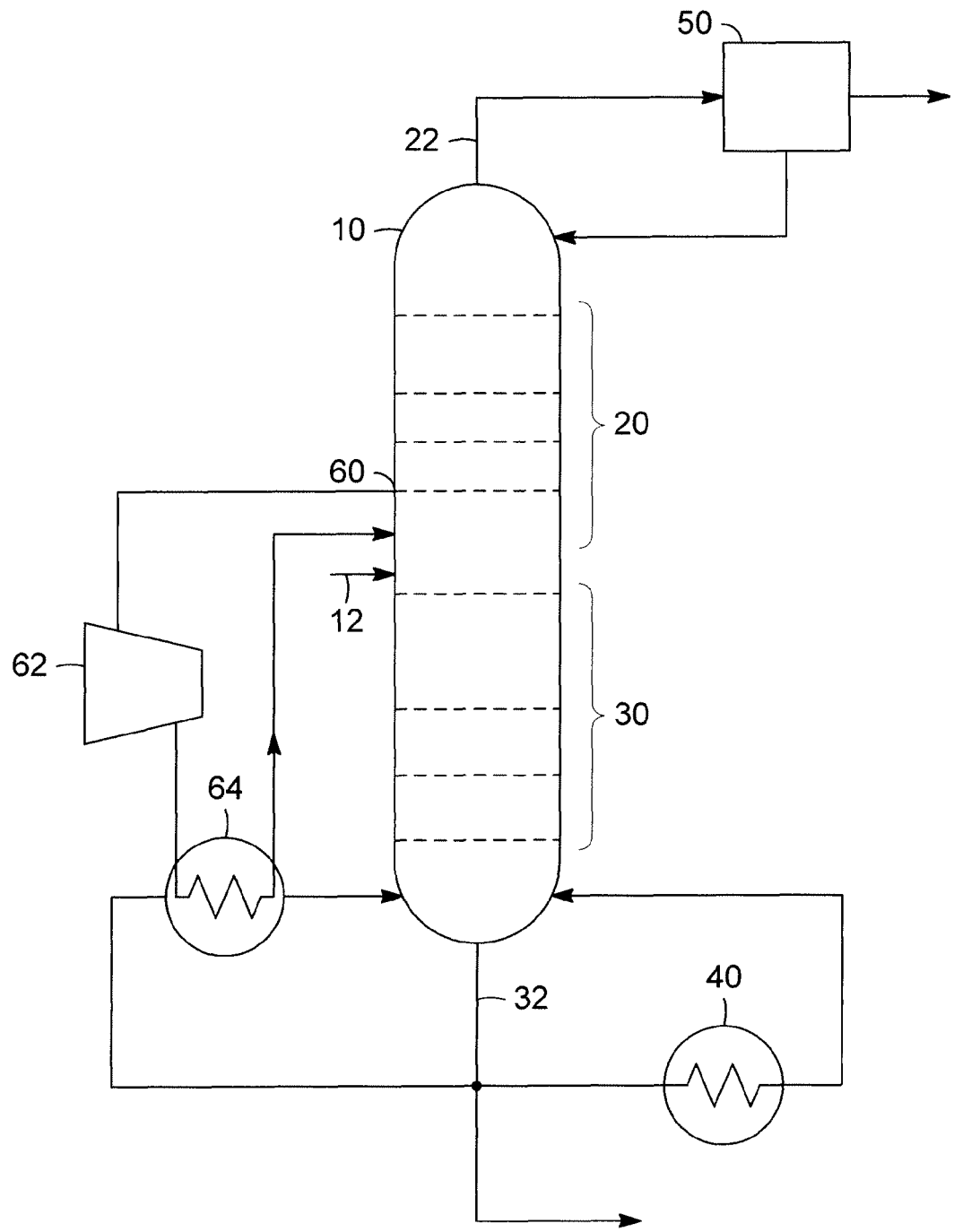
FIG. 1 shows a diagram of an embodiment of the invention.

When the bottoms product has a high purity requirement, energy can be saved by compressing intermediate vapors streams from the rectifying section to reboil the bottoms stream. The present invention provides for an efficient reboiling of the bottoms stream. The apparatus for a distillation separation of the present invention is shown in FIG. 1. The apparatus includes a distillation column 10 with a feed inlet 12, a rectifying section 20 disposed above the feed inlet 12 and having an outlet 22 for an overhead vapor stream, and a stripping section 30 disposed below the feed inlet 12 and having an outlet 32 for a bottoms liquid stream. The apparatus further includes a bottoms reboiler 40 for reboiling the bottoms liquid stream, and an overhead condensing section 50 for condensing the overhead vapor stream. The apparatus further includes a side vapor draw 60 from the rectifying section 20. The side vapor draw 60 is passed to heat pump compressor 62, where the vapor from the side vapor draw 60 is compressed. The compressed vapor is passed to the vapor side of a second reboiler heat exchanger 64. A portion of the bottoms liquid is passed to the liquid side of the second reboiler heat exchanger 64. The bottoms liquid is reboiled to produce a vapor and fed to the bottom of the stripping section 30 of the distillation column 10. The compressed vapor will be preferably condensed, and the condensed vapor from the reboiler heat exchanger 64 is directed to an inlet in the rectifying section 20 of the distillation column 10.

For efficiency, when the apparatus is for producing a bottoms product having a high purity requirement, the rectifying section 20 can be reduced in size by withdrawing vapor through the side vapor draw 60, and the side vapor draw 60 can be positioned above the lowest tray in the rectifying section 20. The feed is allowed to separate into liquid and vapor from the feed, and drawing a portion of the vapor flowing through the rectification section 20, reduces the volume flow of vapor and liquid through the rectifying section 20 above the side vapor draw. By drawing off an intermediate stream for compression, the compression ratio is reduced and saves energy through operation of a compressor at lower severity.

Through the use of compressing intermediate vapor streams to reboil the bottoms, there will be a significant decrease in the external energy required for a distillation column. Compressing the intermediate vapor streams will reduce the compression ratio, and provide energy savings from reduced utilities. For vapor streams from the top of the column, the composition will differ and there will be a greater compression ratio. This invention will be especially useful for separation of similar components having close boiling points. For example, in the separation of a propane/propylene mixture, the distillation is carried out at elevated pressures and due to the similar properties, a high degree of separation would require a large number of stages, or trays, in a distillation column. The use of compressing intermediate streams drawn off from the rectifying section can provide a significant amount of energy for reboiling of the bottoms stream. If only a propane stream needs to be purified, the the rectifying section can be smaller and compressed streams drawn off from the rectifying section will have heat sufficient to reboil a portion of the bottoms.

Figure 2:
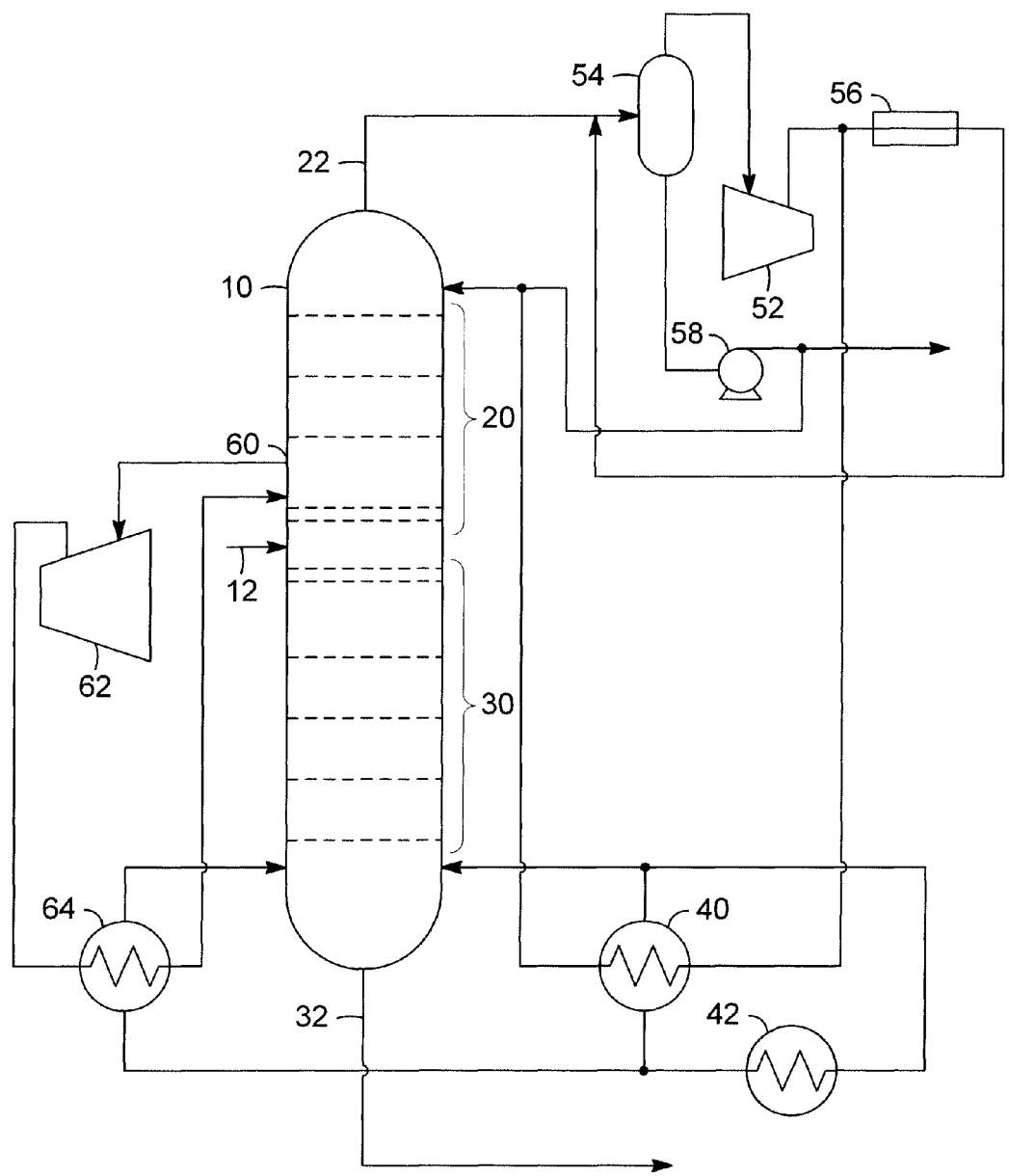
FIG. 2 shows a diagram of an embodiment with an additional heat pump compressor for compressing the overhead vapor stream.

In another embodiment, as shown in FIG. 2, the apparatus further includes a second heat pump compressor 52 for compressing the overhead vapor stream. The overhead vapor stream passes to a vapor-liquid separator 54, where the vapor is directed to the compressor 52. A portion of the liquid from the vapor-liquid separator is directed to product, while a second portion is directed to liquid reflux in the column 10. In this embodiment, the bottoms reboiler 40 is a reboiler heat exchanger, with the compressed overhead vapor stream passes on the vapor side of the heat exchanger, and a portion of the bottoms liquid passes on the liquid side of the heat exchanger reboiler 40. The compressed vapor is at least partly condensed, and redirected to the top of the column 10. The condensed liquid is under pressure, and passes through a pressure reducing valve where upon entry to the top of the rectifying section 20 of the column 10, the liquid partially flashes. The condensed liquid can enter a separate port at the top of the rectifying section, or can enter through the reflux entry port. The vapor exits the outlet 22 of the rectifying section 20 and the liquid is used as a reflux for the rectifying section 20. Excess condensed liquid from the vapor-liquid separator 54 is pumped via a pump 58 to storage, or other operational units within a petrochemical plant.

The apparatus further includes a third reboiler 42, also known as a trim reboiler. The third reboiler 42 provides additional heat when there is insufficient heat from the first reboiler heat exchanger 40 and the second reboiler heat exchanger 64.

A portion of the compressed overhead vapor stream can be passed through a trim condenser 56. This portion is condensed and passed to the vapor-liquid separator after passing through a pressure reducing valve to the lower pressure of the vapor-liquid separator. The condensed liquid will partially flash and the remaining liquid will contribute to the reflux in the column 10.

The use of a trim condenser 56 will depend on the amount of compressed overhead vapor that is not needed to be passed to the reboiler 40. This is determined by the heat load requirements of the reboiler 40 and the amount of compressed overhead vapor to be condensed.

The invention also provides for a process of separating a less volatile component in in a mixture when the bottoms product has a high purity requirement. By using a heat pump compressor, intermediate vapor streams can be used to provide the heat to reboil the bottoms stream for the distillation column. The process comprises passing a mixture to a feed section of a distillation column, having a rectifying section above the feed section and a stripping section below the feed section. The process generates an overhead vapor stream and a bottoms stream. A portion of the overhead vapor stream is condensed, thereby created a condensed overhead stream. A portion of the condensed overhead stream is passed to the top of the rectifying section as reflux for the distillation process. A portion of the bottoms stream is passed to a first reboiler where the stream is at least partially vaporized and the vaporized bottoms stream is passed to the bottom of the stripping section.

The process further comprises drawing of a side vapor stream from an intermediate stage of the rectifying section, and passing the side vapor stream to a heat pump compressor where the vapor stream is compressed to form a compressed side vapor stream. The compressed side vapor stream is passed to the vapor side of a second reboiler heat exchanger, and is used to reboil a portion of the bottoms stream which is passed to the liquid side of the second heat exchanger. The bottoms stream is vaporized and passed to the bottom of the stripping section. The compressed side vapor stream is cooled and partially or wholly condensed, and passed to an inlet port in the rectifying section of the column. The condensed compressed side vapor stream passes through a pressure reducing valve and partially flashes as it is passed to the distillation column, thereby creating a side feed stream that is partially liquid and partially vapor.

In an alternative embodiment of the process, the overhead vapor stream is passed to a vapor-liquid separator, thereby creating a vapor stream and a liquid stream for use as reflux. The vapor stream is passed to an overhead heat pump compressor creating a compressed overhead vapor stream. The compressed overhead vapor stream is heated as a result of the compression and is used for reboiling a portion of the bottoms stream. In this embodiment, the first reboiler is a heat exchanger where the compressed overhead vapor stream is passed to the vapor side of the heat exchanger. A portion of the bottoms stream is passed to the liquid side of the first reboiler and a portion of the bottoms stream is vaporized to create a bottoms vapor stream. The bottoms vapor stream is then passed to the bottom of the stripping section. The compressed overhead vapor stream is cooled and a portion of the stream condenses. Preferably, the first reboiler is sized and operated at conditions to condense all of the compressed overhead vapor stream.

The condensed overhead vapor stream is at an elevated pressure and passes through a pressure reducing valve before passing to the top of the rectifying section of the column. The condensed stream will flash as it is passed to the column and a portion of the liquid from the flash will provide a reflux stream for the rectifying section. The vapor that is generated from the flashed condensed stream is passed to the vapor-liquid separator.

Figure 3:
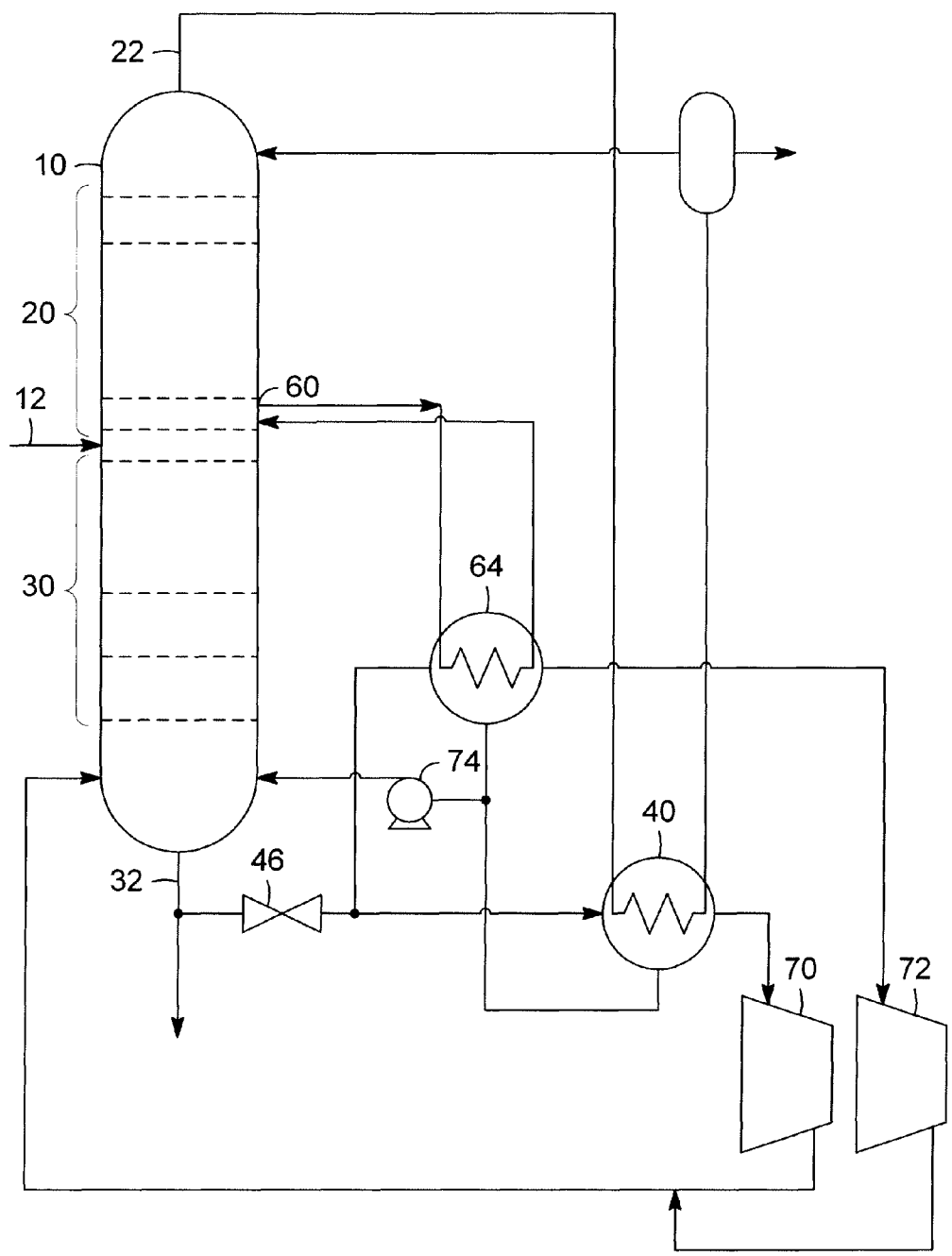
FIG. 3 shows a diagram for an alternate embodiment with flashing of the bottoms liquid.

In an alternate embodiment, the improved purification of the bottoms stream involves the reducing of the pressure of the bottoms stream and reboiling the reduced pressure bottoms stream for a bottoms vapor feedstream. As shown in FIG. 3, the apparatus comprises a distillation column 10 having a rectifying section 20 with an outlet 22 for an overhead vapor stream, a stripping section 30 with an outlet 32 for a bottoms liquid stream, and a feed section with a feed inlet 12 disposed between the rectifying section 20 and the stripping section 30. The apparatus further includes a reboiler section, where the reboiler section includes a means 46 for reducing the pressure of the liquid bottoms stream, a first reboiler 40 having a liquid side in fluid communication with the reduced pressure bottoms stream, and a vapor side in fluid communication with the overhead vapor stream, and a first heat pump compressor 70 in fluid communication with the first reboiler liquid side. The overhead vapor stream which is condensed in the first reboiler 40 is passed to a vapor-liquid separation drum and is in fluid communication with the top of the rectifying section 20.

The apparatus further includes a side draw 60 for drawing off a vapor stream from the rectifying section 20. The side vapor draw is in fluid communication with the vapor side of a second reboiler 64. The liquid side of the second reboiler 64 is in fluid communication with a reduced pressure liquid bottoms stream. The reduced pressure liquid bottoms stream can be drawn from the already reduced pressure liquid bottoms stream passing through the pressure reducing means 46, or can be a separate portion of the liquid bottoms stream that is passed through a second pressure reducing means (not shown). A second heat pump compressor 72 is in fluid communication with the reboiled bottoms stream, and generates a compressed bottoms vapor stream that is passed to the bottom of the stripping section 30.

The pressure reducing means 46 can be a Joule-Thompson valve, or any other means for reducing the pressure of the bottoms liquid stream. Other means includes passing the liquid through a turbine to drive a motor and recover some of the energy expended in the process of reducing the pressure.

The process for this embodiment comprises passing a mixture to the feed section of the distillation column 10. The distillation column 10 is operated to create a vapor stream flowing up through the column 10 and a liquid stream flowing down through the column, with an overhead vapor stream leaving the outlet 22 of the rectifying section 20 and a bottoms liquid stream leaving the outlet 32 of the stripping section 30. A portion of the liquid bottoms stream is passed through a pressure reducing means 46 and creating a reduced pressure bottoms stream. The reduced pressure bottoms stream is passed to a first reboiler 40 on the liquid side of the reboiler. The overhead vapor stream is passed to the vapor side of the first reboiler 40. The overhead vapor stream condenses thereby generating a condensed stream, and the reduced pressure bottoms stream vaporizes thereby creating a bottoms vapor stream. The condensed overhead stream is passed to the top of the rectifying section 20 as reflux.

The reduced pressure bottoms stream is reboiled in the reboiler 40, and generates a bottoms vapor stream. Any liquid from the reduced pressure bottoms stream not reboiled is separated and collected and redirected back to the bottom of the stripping section 30. Since the liquid is at a reduced pressure, the liquid pressure is increased by a pump 74 to a pressure sufficient to deliver the liquid to the stripping section 30. Liquid-vapor separation of the reboiled liquid is to prevent liquid from going to the heat pump compressors 70, 72. The bottoms vapor stream is compressed with a heat pump compressor 70, thereby creating a compressed bottoms vapor stream. The bottoms vapor stream is passed to the bottom of the stripping section 30 to provide heat and vapor to strip out more volatile components from the fluid flowing down the distillation column 10.

A second portion of the liquid bottoms stream is passed through a means for reducing the pressure of the liquid. The second portion can have a separate pressure reducing means, such as a separate valve, or can be drawn off from the first portion of the bottoms liquid after the first portion has passed through the means for reducing pressure. A second pressure reducing means provides for control the temperature driving force needed to transfer heat and thereby reboil the second portion of the liquid bottoms stream. The second portion passes through a second reboiler 64 where the second portion is vaporized to form a second bottoms vapor stream. Any of the second portion of the liquid bottoms stream that is not vaporized is separated and collected, and pumped back to the bottom of the stripping section 30 through a pump 74. The second bottoms vapor stream is compressed by a second heat pump compressor 72, thereby creating a second compressed bottoms vapor stream. The second compressed bottoms vapor stream is then passed to the bottom of the stripping section 30 to add additional vapor for the distillation process. The remainder of the liquid bottoms stream is a bottoms product that has a higher purity.

A vapor side stream is drawn from a side port 60 in the distillation column 10 and is passed through the vapor side of the second reboiler 64, where the vapor side stream condenses. The condensed side stream is then passed to the distillation column 10 as a side liquid feed. It is preferred that the vapor side stream is drawn near the bottom of the rectifying section 10.

Figure 4:
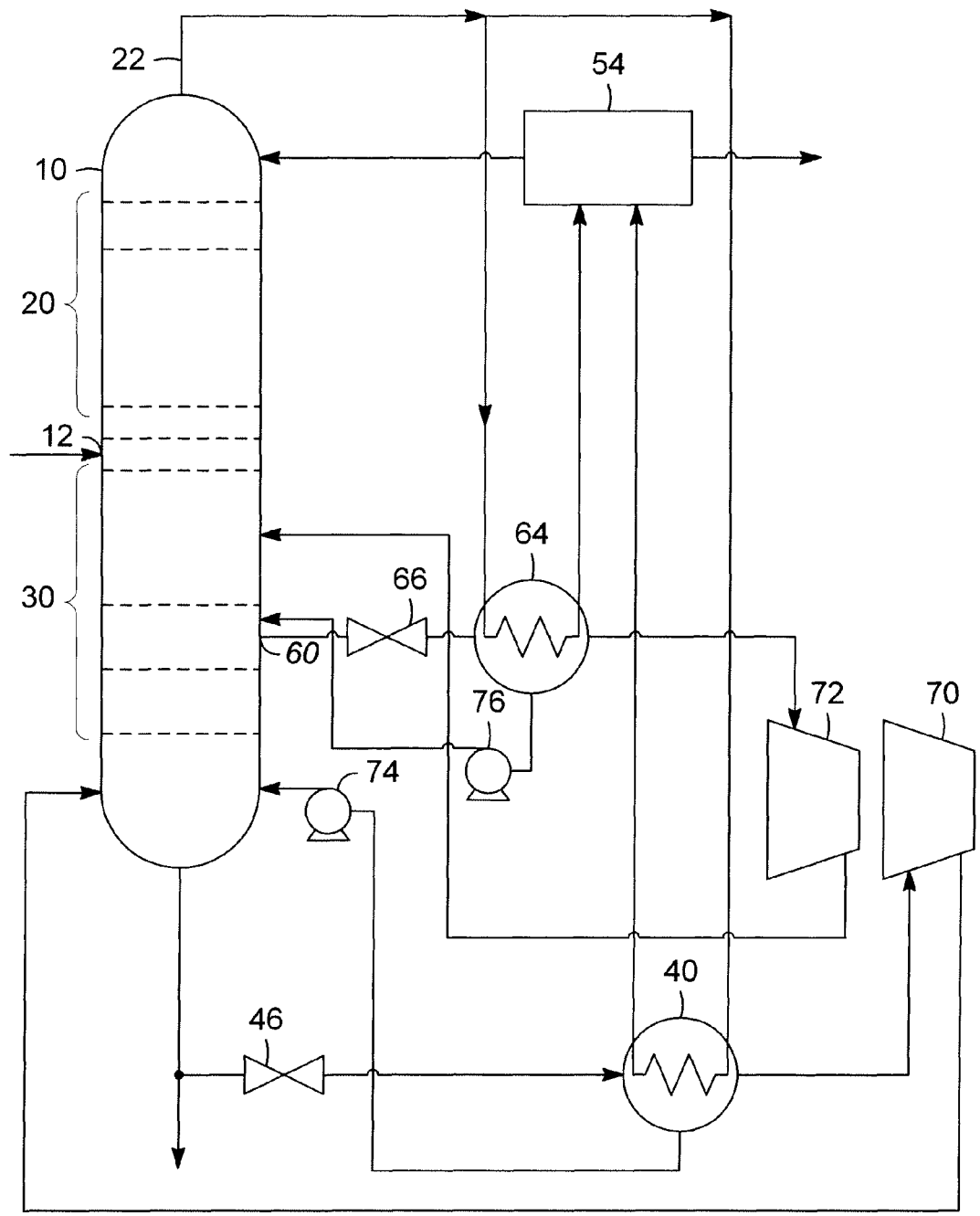
FIG. 4 shows an alternate diagram for the embodiment with flashing of the bottoms liquid.

Another variation of this embodiment is shown in FIG. 4. The apparatus comprises the distillation column 10 having a rectifying section 20 and a stripping section 30. The apparatus further comprises a first means 46 for reducing the pressure of the liquid bottoms stream, and a first reboiler 40 having a liquid side in fluid communication with the reduced pressure liquid bottoms stream. A portion of the overhead vapor stream is passed to the vapor side of the first reboiler 40, where the overhead vapor stream condenses and the liquid bottoms stream is vaporized. Any of the liquid bottoms stream not vaporized is separated and collected, and pumped back to the bottom of the stripping section 30. A pump 74 increases the liquid pressure to at least the pressure of the bottom of the stripping section 30 for unvaporized liquid collected from the first reboiler 40. The vaporized bottoms stream is compressed with a heat pump compressor 70, thereby generating a compressed vapor stream and is passed to the bottom of the stripping section 30. The condensed overhead vapor stream is passed to the top of the rectifying section 20 as reflux. Preferably, the condensed overhead vapor stream is first passed to a vapor-liquid separation tank 54. The tank 54 collects the liquid and sends a portion out as overhead distillate, while returning the remainder to the top of the rectifying section 20.

The apparatus further includes a port 60 for drawing off an intermediate liquid stream from the column 10. Preferably, the port 60 is in the stripping section 30 of the column. The intermediate liquid stream is passed through a second pressure reducing means 66 and generating a reduced pressure intermediate liquid stream. The reduced pressure intermediate liquid stream is in fluid communication with the liquid side of a second reboiler 64, where at least a portion of the liquid is vaporized. Any of the intermediate liquid stream that is not vaporized is separated and collected and returned to the stripping section 30. The liquid portion from the second reboiler 64 that is not vaporized is passed through a second pump 76 to a pressure sufficient to return the liquid to the column 10. The liquid portion not vaporized can be returned to the stripping section at or below the liquid draw off port 60. In one embodiment, it is returned with the liquid recovered from the first reboiler. A second portion of the overhead vapor stream is passed to the vapor side of the second reboiler 64, where the second portion is at least partially condensed. The vaporized intermediate stream is compressed with a second heat pump compressor 72, and the compressed intermediate vapor is returned to the column 10. Preferably, the vapor is returned to a position in the column 10 above the tray where the intermediate liquid stream is drawn from the port 60. The condensed overhead vapor stream is in fluid communication with the top of the rectifying section, where the condensed stream will be returned as reflux.

The process comprises using the overhead vapor stream to reboil the liquid bottoms stream and an intermediate liquid stream. The liquid streams are passed through pressure reducing means and will vaporize at lower temperatures. The vaporized streams are then compressed, where the vapor is heated through the compression. The heated and compressed vapor is then passed back to the distillation column to provide the upflowing vapor for stripping the downflowing liquid.

In this embodiment, a mixture is passed to the feed section of the distillation column. The distillation column has an outlet at the top of the rectifying section 20 for an overhead vapor stream, and an outlet at the bottom of the stripping section 30 for a liquid bottoms stream. A portion of the bottoms stream is passed through a pressure reducing valve 46 to a first reboiler 40, where it exchanges heat with a portion of the overhead vapor stream. The bottoms stream is vaporized and the overhead vapor stream is condensed. The vaporized bottoms stream is compressed with a heat pump compressor 70, creating a compressed and heated bottoms vapor stream. The bottoms vapor stream is passed to the bottom of the stripping section 30 for providing heat to strip out components from liquid flowing down through the column 10. The condensed overhead vapor stream is passed to the top of the rectifying section 20 as reflux.

The process further comprises drawing off a liquid stream from an intermediate port 60 in the column 10 and passing the intermediate liquid stream through a pressure reducing valve 66 to produce a reduced pressure intermediate liquid stream, which is passed to a second reboiler 64. The reduced pressure liquid stream is heat exchanged with a second portion of the overhead vapor stream, where the reduced pressure liquid stream is vaporized and the overhead vapor stream is condensed.

The reboiled intermediate vapor stream is compressed with a second heat pump compressor 72 and passed to an intermediate inlet port in the column 10. Preferably, the vapor is passed to above the tray where the intermediate liquid is drawn out of the port 60 in the column. The second condensed portion of the overhead vapor stream is passed to the top of the rectifying section 20 as additional reflux.

By using the heat from the compressed intermediate stream, energy is more efficiently used in the distillation process, and this can further reduce the size of the distillation column below the intermediate draw as there is lower vapor and liquid flow through the stripping section below the intermediate draw.

While the invention has been described with what are presently considered the preferred embodiments, it is to be understood that the invention is not limited to the disclosed embodiments, but it is intended to cover various modifications and equivalent arrangements included within the scope of the appended claims.

The invention claimed is:

1. A process of separating a less volatile component in a mixture comprising:
   passing the mixture to a feed section of a distillation column having the feed section, a stripping section and a rectifying section, wherein the stripping section has an outlet for drawing off a bottoms stream, and the rectifying section has a first outlet for drawing off an overhead vapor stream and a second outlet for a side vapor stream;
   passing a portion of the overhead vapor stream to a condenser, thereby creating a overhead condensed stream;
   passing a portion of the bottoms stream to a first reboiler, thereby creating a bottoms vapor stream;
   passing a portion of the bottoms stream to a second reboiler, where in the second reboiler is a heat exchanger with a liquid side and a vapor side, thereby creating a second bottoms vapor stream;
   drawing of the side vapor stream from a first vertical position of the distillation column and passing the side vapor stream to a heat pump compressor thereby creating a compressed side vapor stream;
   passing the compressed side vapor stream to the vapor side of the second reboiler, thereby creating a cooled compressed side return stream;
   passing the cooled compressed side return stream to a second vertical position of the distillation column, below the first vertical position; and
   passing the bottoms vapor stream and the second bottoms vapor stream to the bottom of the stripping section.

2. The process of claim 1 further comprising passing the overhead vapor stream to an overhead heat pump compressor before passing a portion of the overhead vapor stream to the condenser, thereby creating a compressed overhead stream.

3. The process of claim 2 further comprising passing a portion of the compressed overhead vapor stream to the first reboiler, thereby creating a cooled compressed overhead stream.

4. The process of claim 3 further comprising passing the cooled compressed overhead stream to the top of the rectifying section.

5. The process of claim 2 further comprising condensing a portion of the compressed overhead vapor stream, thereby creating a condensed overhead stream.

6. The process of claim 5 further comprising passing a portion of the condensed overhead stream to the rectifying section.

7. The process of claim 1 further comprising passing a portion of the overhead condensed stream to the top of the rectifying section.

8. The process of claim 1 further comprising passing the cooled side return stream to the rectifying section.

9. A process of separating a less volatile component in a mixture comprising:
passing the mixture to a feed section of a distillation column having the feed section, a stripping section and a rectifying section, wherein the stripping section has an outlet for drawing off a liquid bottoms stream, and the rectifying section has a first outlet for drawing off an overhead vapor stream;
passing a portion of the bottoms stream through a means for reducing the pressure in the bottoms stream, thereby creating a reduced pressure bottoms stream;
passing the reduced pressure liquid bottoms stream to a first reboiler, thereby creating a bottoms vapor stream;
compressing the bottoms vapor stream in a heat pump compressor, thereby creating a first compressed bottoms vapor stream;
passing the first compressed bottoms vapor stream to the bottom of the stripping section;
passing a portion of the overhead vapor stream to the first reboiler, thereby creating a first condensed stream;
passing the first condensed stream to the top of the rectifying section of the distillation column as reflux;
passing a second portion of the liquid bottoms stream to a second reboiler, where in the second reboiler is a heat exchanger with a liquid side and a vapor side, thereby creating a second bottoms vapor stream;
drawing a vapor side stream from a first vertical position of the distillation column and passing the side stream to the vapor side of the second reboiler, thereby creating a condensed side stream;
passing the condensed side stream to a second vertical position of the distillation column below the first vertical position of the distillation column as a side liquid feed;
compressing the second bottoms vapor stream in a heat pump compressor, thereby creating a second compressed bottoms vapor stream; and
passing the second compressed bottoms vapor stream to the bottom of the stripping section.

10. The process of claim 9 wherein the second portion of the bottoms stream is passed through a second means for reducing the pressure.

11. The process of claim 9 wherein the means for reducing pressure is a Joule-Thompson valve.

12. The process of claim 9 wherein the means for reducing pressure is a turbine, thereby generating power.

13. The process of claim 9 wherein the vapor side stream is drawn from a port in the rectification section of the column.

14. The process of claim 9 further comprising passing another portion of the liquid bottoms stream as purified product.

15. A process of separating a less volatile component in a mixture comprising:
passing the mixture to a feed section of a distillation column having the feed section, a stripping section and a rectifying section, wherein the stripping section has an outlet for drawing off a bottoms stream, and the rectifying section has a first outlet for drawing off an overhead vapor stream;
passing a portion of the bottoms stream through a means for reducing the pressure in the bottoms stream, thereby creating a reduced pressure bottoms stream;
passing the reduced pressure bottoms stream to a first reboiler, thereby creating a bottoms vapor stream;
compressing the bottoms vapor stream in a heat pump compressor, thereby creating a first compressed bottoms vapor stream;
passing the first compressed bottoms vapor stream to the bottom of the stripping section;
passing a portion of the overhead vapor stream to the first reboiler, thereby creating a first condensed stream;
passing the first condensed stream to the top of the rectifying section of the distillation column as reflux;
drawing a liquid side stream from a port in the distillation column at a first vertical position;
passing the liquid side stream through a means for reducing the pressure of the liquid side stream, thereby creating a reduced pressure liquid side stream;
passing the reduced pressure liquid side stream to a second reboiler, where in the second reboiler is a heat exchanger with a liquid side and a vapor side, thereby creating a side vapor stream;
compressing the side vapor stream through a second heat pump compressor, thereby creating a compressed side vapor stream;
passing the compressed side vapor stream to a side port in the column above the first vertical position;
passing a portion of the overhead vapor stream to the vapor side of the second reboiler, thereby creating a second condensed stream; and
passing the second condensed stream to the top of the rectifying section as reflux.

16. The process of claim 15 wherein the means for reducing the pressure of the liquid streams are Joule-Thompson valves.

17. The process of claim 15 further comprising passing another portion of the liquid bottoms stream as purified product.

18. The process of claim 15 wherein the liquid side stream is drawn from the stripping section.

19. The process of claim 15 wherein the means for reducing the pressure of the liquid streams are turbines.

* * * * *